United States Patent [19]

Benhase, Jr.

[11] 4,265,334
[45] May 5, 1981

[54] APPARATUS FOR LUBRICATION OF A DIFFERENTIAL BEARING MOUNTED BETWEEN CONCENTRIC SHAFTS

[75] Inventor: George J. Benhase, Jr., West Chester, Ohio

[73] Assignee: General Electric Company, Cincinnati, Ohio

[21] Appl. No.: 965,953

[22] Filed: Dec. 4, 1978

[51] Int. Cl.³ .......................... F02C 7/06; F16D 3/46
[52] U.S. Cl. .................................... 184/6.11; 60/39.08
[58] Field of Search .................. 184/6.11; 60/39.08; 308/187

[56] References Cited

U.S. PATENT DOCUMENTS

| 2,951,337 | 9/1960 | Atkinson et al. | 184/6.11 X |
| 3,085,838 | 4/1963 | Patterson | 308/187 |
| 3,248,880 | 5/1966 | Hull et al. | 184/6.11 UX |
| 3,528,241 | 9/1970 | Venable et al. | 184/6.11 |
| 3,903,690 | 9/1975 | Jones | 60/39.08 |
| 3,909,085 | 9/1975 | Wilkinson et al. | 308/187 X |
| 4,013,141 | 3/1977 | James | 184/6.11 |
| 4,144,950 | 3/1979 | Moyer | 60/39.08 X |

FOREIGN PATENT DOCUMENTS 1216115 12/1970 United Kingdom .................. 60/39.08

Primary Examiner—David H. Brown
Attorney, Agent, or Firm—Donald W. Walk; Derek P. Lawrence

[57] ABSTRACT

An apparatus is provided to supply oil to a differential bearing mounted between relatively rotating concentric shafts, for example, inside a gas turbine engine. In one form, the apparatus includes a fixed nozzle that injects oil into an annular collector dam mounted on the outer floating shaft. The dam construction utilizes centrifugal force to cause the oil to flow forward through passages into an interior area of the outer shaft. Inside such shaft, the oil is directed by dispensers into an oil transfer tube that traverses the distance inside the shaft from the dispensers to the bearing. The inside wall of the tube is flared to a larger diameter at the forward end, and the centrifugal force resulting from shaft rotation forces the oil forward into the bearing. At the forward end, the transfer tube contacts the outer race of the bearing thereby lubricating the bearing throughout a 360 degree surface area. After lubricating and traversing the rotating contact surfaces of the bearing, the oil is directed to a scavenge cavity for recycling through the engine lubrication system.

4 Claims, 3 Drawing Figures

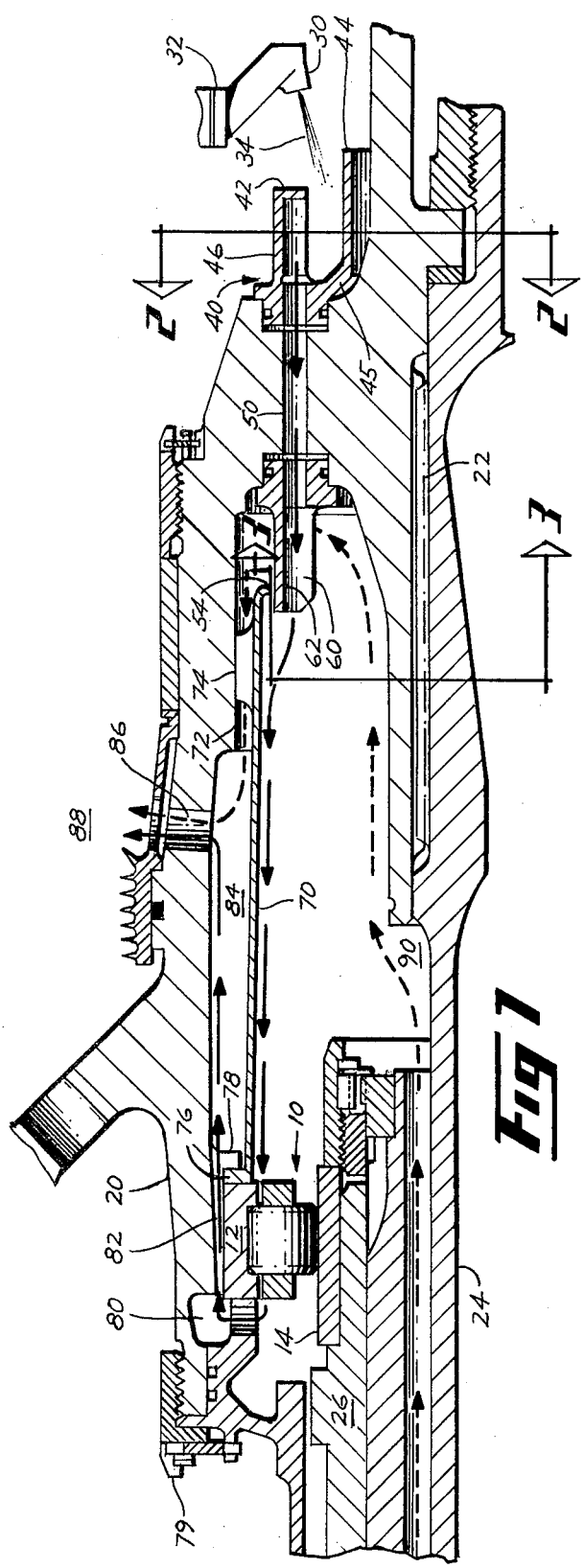
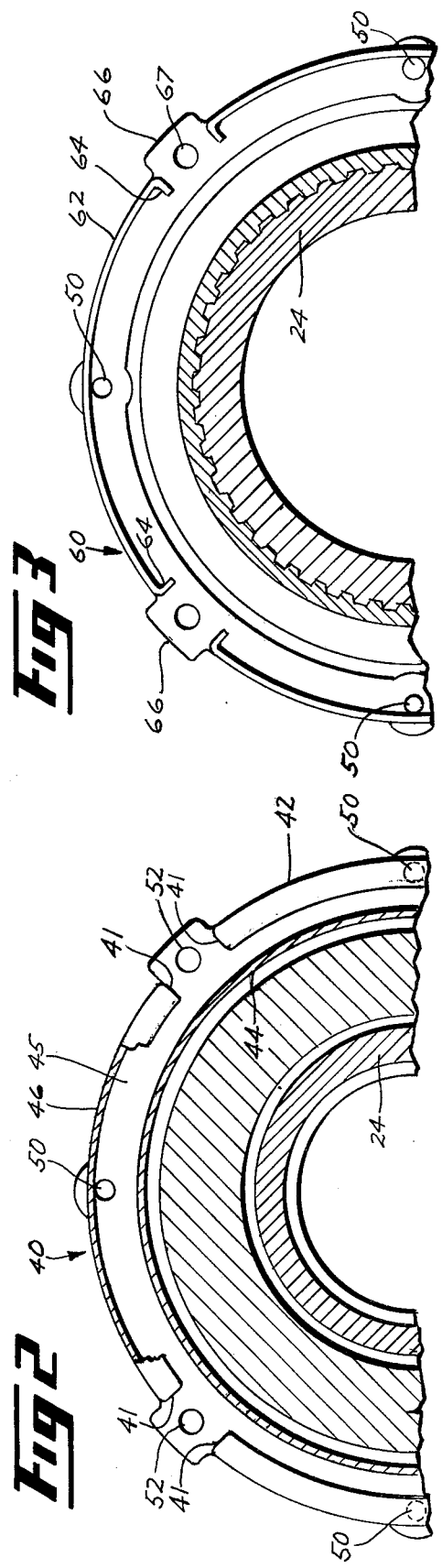

APPARATUS FOR LUBRICATION OF A DIFFERENTIAL BEARING MOUNTED BETWEEN CONCENTRIC SHAFTS

BACKGROUND OF THE INVENTION

1. Field of the Invention

This invention relates to machine lubrication systems, and more particularly, to means for providing lubrication to a differential bearing mounted between relatively rotating concentric shafts.

2. Description of the Prior Art

In the modern gas turbine engine, compressor and turbine rotors are attached to a central rotating shaft, and the turbine portion of the engine powers the compressor portion through this central shaft. Typically, this turbine shaft is positioned by bearing assemblies attached to stationary support housings. Due to the nature of the operation of the gas turbine engine, the turbine shaft necessarily rotates at high speeds. Consequently, the bearing assemblies must be lubricated and cooled with a liquid lubricant during engine operation. The lubricant is usually provided by nozzles that inject oil into the bearing assembly during engine operation.

This relatively simple and effective means of lubrication has been complicated by modern dual rotor turbine construction. Dual rotor turbines utilize two independent rotor systems, one being a low pressure system, and the other being a high pressure system. The two systems are driven through two separate concentric shafts, and each shaft can rotate independently of the other.

In the past, heavy supporting structures have been used to support these concentric shafts. In order to eliminate these heavy structures, it is desirable to support the concentric shafts, relative to each other, with differentially mounted bearings, such as roller bearings. In a differential mounting system, the bearing outer race and the bearing inner race are fixed to their respective outer and inner rotating shafts. The shafts can rotate at different speeds and sometimes rotate in opposite directions. While the bearing must be lubricated, the location of the bearing inside the outer rotating concentric shaft makes it impossible to mount a conventional oil nozzle on a stationary member in close proximity to the bearing.

Because an oil nozzle cannot be mounted near the bearing, a different apparatus must be provided to lubricate the bearing. This apparatus must be capable of introducing the lubricant into the interior region of the outer shaft while the shaft is rotating. Introducing lubricant into a rotating shaft is a common problem, and various solutions are disclosed in the prior art. For example, U.S. Pat. No. 3,085,838—Patterson describes a lubrication means employing an annular dam construction attached to a rotating shaft, into which oil or other lubricant is injected with a nozzle. The dam construction causes the lubricant that collects within the dam to be forced into the interior of the shaft by centrifugal force resulting from shaft rotation. Once the lubricant reaches the interior of the shaft, it is well known to those skilled in the art to transport the lubricant by means of centrifugal forces along a flaring inner diameter to the proximity of a device, such as a bearing, requiring lubrication.

The means described in the aforementioned Patterson patent will effectively introduce lubricant into a device mounted between two relatively rotating concentric shafts. While variations of this system are described in additional patents, the prior art does not disclose such a lubrication system wherein the lubricant is introduced through an outer rotating shaft at a position remotely located in respect to an internally mounted bearing, and wherein the lubricant is distributed over 360 degrees of a circular-shaped interface, thereby more effectively lubricating and cooling the bearing.

The currently employed systems, such as that disclosed in U.S. Pat. No. 3,909,085—Wilkinson, et al., generally direct the lubricant to a region located radially inward from the inner race of the bearing structure. The actual transfer of the lubricant into the interior of the bearing structure is accomplished by feeding the oil through radially extending holes into the bearing inner race. All of the extending holes are positioned in the highly stressed region near the bearing, and high stress concentrations develop around each of these holes. In addition, the lubricant is distributed to the bearing at several individual locations, rather than over a broadly curved interface.

In addition, the lubrication systems described in the prior art do not disclose any means for providing a cooling airflow along the internal regions of the concentric shafts. The high rotational speeds of these concentric shafts often make it necessary to provide an axial flow of pressurized air to cool the shafts and the associated internal structures. This cooling air must be transported between the shafts and exhausted somewhere in the region of the aft end of the outer concentric shaft. It is not practical to exhaust this air at the very end of the shaft because driving connections are made at this region, and the ends of the shafts are therefore necessarily closed. Provision generally is necessary in a lubrication system positioned inside the outer concentric shaft for a dual fluid cross-flow, whereby the lubricant flows within the rotating shaft, and the cooling air flows aft to exit the shaft without disrupting the flow of lubricant.

It is, therefore, an object of the present invention to provide an apparatus for lubricating a differential bearing mounted between relatively rotating concentric shafts, whereby the lubricant is introduced into the outer shaft at a location remote from the bearing, transported within the shaft, and distributed over 360 degrees of surface area.

It is also an object of the present invention to provide an apparatus for lubricating a differential bearing mounted between relatively rotating concentric shafts whereby the lubricant is transported to the bearing without the use of holes or similar structural elements that create stress concentrations in close proximity to the bearing.

It is also an object of the present invention to provide an apparatus for lubricating a differential bearing mounted between relatively rotating concentric shafts whereby provision is made for a cross-flow within the shaft of lubricant and pressurized cooling air.

SUMMARY OF THE INVENTION

An apparatus is provided in a gas turbine engine for introducing lubricant into a differential bearing mounted between relatively rotating concentric shafts. In a particular embodiment of this invention, the lubricant is oil, and it is supplied by the engine oil lubrication system through an oil nozzle mounted on a fixed structural member in the aft end of the turbine. This outer shaft is provided with an oil collector in the form of an annular dam fixed around the outer diameter of the shaft. A stream of oil is ejected by the oil nozzle and directed into this annular dam while the shaft and the dam attached to the shaft are rotating.

The dam, in one form, includes a segmented radial wall that employs centrifugal force to direct the oil forward through circumferentially spaced axial passages or holes in the shaft. Each of these axial holes communicates with an oil dispenser fixed to the inner bore of the shaft. The dispensers extend forward within the shaft and thereby direct the oil towards the differential bearing.

The forward end of each oil dispenser is located radially inward of a single surrounding oil transfer tube. This oil transfer tube is positioned within the outer concentric shaft for transporting the oil within the shaft from the dispensers to the bearing. This transfer tube is fitted to rotate with the shaft. The inside wall of the tube is flared to a larger diameter at the forward end, and centrifugal forces resulting from shaft rotation force the oil forward into the bearing.

As the oil is transferred forward in the transfer tube, it spreads circumferentially to form a thin film around the entire 360 degrees of the inner wall of the transfer tube. The forward end of the transfer tube directly contacts the outer race of the bearing, and the flow enters a full 360 degrees of a circular interface between the bearing and the transfer tube.

A collector groove is provided in the outer shaft at a position adjacent and forward of the bearing. The oil collects in this groove after traversing and lubricating the width of the bearing. To remove the oil from the region of the bearing, axially tapered slots are positioned around the outside diameter of the bearing to provide a path for the oil to flow in the aft direction from the collector groove. The axial slots enter into a lubrication transfer region inside the outer shaft. Holes are drilled in the shaft into this transfer region and the oil is directed from the lubrication transfer region, through these holes, into an oil scavenging area. Mechanisms located in this oil scavenge area are provided for recycling the oil through the engine lubrication system.

BRIEF DESCRIPTION OF THE DRAWINGS

While the specification concludes with the claims, particularly pointing out and distinctly claiming the subject matter of the invention, it is believed the invention will be better understood from the following description taken in conjunction with the accompanying drawings, wherein:

FIG. 1 is a partial cross section view of a gas turbine engine showing the apparatus of the present invention for lubrication of a differential bearing mounted between concentric main engine shafts;

FIG. 2 is an enlarged view, partly in section and partly broken away, taken along line 2—2 of FIG. 1, showing an oil collector of this invention; and FIG. 3 is an enlarged view, taken along line 3—3 of FIG. 1, showing an oil dispenser of this invention.

DESCRIPTION OF THE PREFERRED EMBODIMENT

Referring now to FIG. 1, an apparatus is shown that provides lubricant to a lubrication-receiving device mounted between concentric cylindrical main engine shafts 20 and 26 in a gas turbine aircraft engine. In the embodiment shown, the lubrication-receiving device is a differential bearing 10 that separates and permits relative rotation of the two shafts. The engine shown is dual rotor turbine utilizing two independent rotor systems, a low pressure system, associated with shaft 20, and a high pressure system, associated with shaft 26. Each of these systems employs its rotating shaft located axially in the center of the engine to connect a compressor rotor, mounted forward in the engine, to a turbine rotor mounted aft in the engine. Two independent systems are provided to allow rotation of the low pressure turbine and compressor at one speed and the high pressure turbine and compressor at a different speed to facilitate engine operation and engine efficiency.

Each independent system utilizes an independent shaft, and the two shafts are located coaxially with a concentric construction. As shown in FIG. 1, a low pressure turbine rotor shaft 20 forms the outer concentric shaft in relation to the bearing 10. This shaft 20 is connected with a spline 22 that provides rotational force to a mid fan shaft 24. The mid fan shaft 24 extends to the forward portion of the gas turbine engine where it rotates the low pressure compressor rotor. Therefore, the low pressure turbine rotor shaft 20 and the mid fan shaft 24 connect the low pressure turbine rotor to the low pressure compressor in the forward end of the engine. In the high pressure system, a high pressure turbine aft shaft 26 forms the inner concentric shaft in relation to the bearing 10. The bearing 10 provides support for the high pressure turbine aft shaft and, in addition, locates the two concentric shafts 20 and 26 in respect to each other.

In one embodiment of this invention, the low pressure shaft 20 and the high pressure shaft 26 rotate at widely varying speeds in respect to each other and, additionally, sometimes rotate in opposite directions. While under cruise conditions, the high pressure shaft 26 rotates in the range of 9000–10,000 rpm, and the low pressure shaft 20 rotates at 3000–5000 rpm, under maximum thrust conditions, the rates increase. Therefore, the bearing 10 must be constantly provided with a flow of oil or other lubricant that performs both a lubricating and a cooling function. Because of the concentric shaft construction, a means must be provided for introducing lubricant into the interior of the outer concentric shaft, transferring the lubricant inside the shaft to the bearing and exhausting the lubricant to the exterior of the shaft. In addition, it is desirable to locate any holes, or similar structural elements, for passage of the oil through the shaft at a position remote from the bearing 10. This is desirable because any holes in the region of the bearing will be subject to higher stress and will cause high stress concentrations.

While meeting the above-stated objectives, the purpose of this invention is to introduce oil into the rotating low pressure shaft 20, transfer the oil within a hollow interior of shaft 20 to the bearing 10 and exhaust the oil at some point well spaced from the bearing to an oil scavenge area for recycling through the engine lubrication system.

Referring now to the right-hand portion of FIG. 1 and to FIG. 2, the apparatus for introducing oil into the hollow interior of rotating low pressure shaft 20 is shown. In FIG. 1, an oil nozzle 30 is attached to a stationary support member 32 near the aft end of the shaft 20. The oil nozzle is connected to the engine lubrication system and is positioned to inject a stream of oil 34 into an oil collector 40 mounted on shaft 20. The collector 40 is constructed in the form of an annular dam, including lip 42 extending radially inwardly for the purpose of collecting the oil from the oil stream 34 and directing that oil through an annular array of passages into the interior of shaft 20. In the specific embodiment of this invention, shown in the drawing, the annular array of passages is comprised of four axial holes 50.

In a cross-sectional view of the oil collector 40, as it is shown in FIG. 1, the oil collector includes an inner axial wall 44, an inclined wall 45, an outer axial wall 46 with a radially inwardly extending lip 42. The nozzle 30 is positioned to direct the oil stream 34 toward the junction of walls 44 and 45. The oil collector 40 is attached to shaft 20 for rotation therewith. Centrifugal force resulting from shaft rotation causes the oil to flow along the wall 45 and collect adjacent the outer axial wall 46 where it builds up because of the inwardly extending lip 42. The axial holes 50 are positioned radially within the region defined by the lip 42, and as the oil layer builds up, it is caused to flow forward through the holes 50.

In a view of the oil collector 40, taken along line 2—2 of FIG. 1, as it is shown in FIG. 2, the oil collector 40 is comprised of quadrants, each quadrant feeding oil to one of the four axial holes or orifices 50. FIG. 2 shows the upper half of the oil collector 40. One entire quadrant of the oil collector 40 is shown, and slightly more than half of the two adjacent quadrants are shown. The sides of each quadrant include side walls 41 for confining the oil within each quadrant during oil buildup. FIG. 2 also shows two of four included bolt locations 52 for attaching the oil collector 40 to the low pressure turbine rotor shaft 20.

As shown in FIGS. 1 and 3, an oil dispenser structure 60 is located at the forward end of the axial holes 50 and is provided for directing the oil from the holes to a position spaced radially inward from the inner diameter of shaft 20. The oil dispenser structure 60, shown in FIGS. 1 and 3, is comprised of four (4) separate dispensers or quadrants, each quadrant of the dispenser structure being aligned with one axial hole and with one of the quadrants of the oil collector. Each of the dispensers includes an axially extending wall 62, and two side portions 64 extending radially inwardly from the wall 62. The side portions 64 are provided for the purpose of confining the axial flow of oil inside each dispenser.

The reason for separating the oil dispenser structure into quadrants is to provide space between the quadrants for a flow of cooling air radially outwardly past the oil dispenser structure 60. In the present embodiment of this invention, this cooling air flows axially through the turbine, as shown by the dashed line arrows in FIG. 1, for the purpose of cooling the concentric shafts 24 and 26. This air must be exhausted from the interior of shaft 26 and eventually from the interior of shaft 20 at the aft region of these two shafts. Because the oil dispenser structure is divided into quadrants with spaces therebetween, such exhaust is accomplished without interferring with the forward flow of oil through each quadrant of the dispenser structure. Adjacent quadrants are connected by flanges 66, as shown in FIG. 3, to complete the assembly of the oil dispenser structure 60. Each flange includes an opening 67 for receiving a bolt to connect the oil dispenser structure to shaft 20. The opening 67 is aligned with the bolt locations 52 in the oil collector, and one bolt extending through the shaft 20 is used at each of the four (4) bolt locations.

Referring now to the middle portion of FIG. 1, an oil transfer tube 70 is provided for the purpose of transferring the oil inside shaft 20 from the dispensers to the differential bearing 10. The transfer tube 70 is positioned radially with lugs 72, carried by tube 70, that press-fit against a pilot 74 machined on an inner wall surface within the hollow interior of shaft 20. The tube 70 is held axially at its forward end where a radial flange 76 of the tube is pressed between a bearing outer race 12 and a plurality of circumferentially spaced lugs 78, one of which is shown extending radially inwardly from shaft 20. The bearing outer race 12 is pressed into position against the lugs 78 on shaft 20 with a spanner nut 79.

The pressure on radial flange 76, as a result of tightening the spanner nut 79, and the interference fit at the pilots 74, with lugs 72, forces the oil transfer tube to rotate with the low pressure turbine rotor shaft 20. As the oil flows forward and leaves the forward edge of wall 62 of each dispenser, the oil is thrown radially outwardly by centrifugal force against the inner wall of a hollow region of oil transfer tube 70. Such inner wall of tube 70 is flared to a larger diameter at the forward end, toward bearing 10, and centrifugal force resulting from shaft rotation forces the oil forward into the bearing 10. The aft end of the transfer tube is curved radially inwardly to form a radial lip 54 that prevents the oil from flowing aft. There is a small radial gap between radial lip 54 and wall 62 of the oil dispensers to facilitate assembly of these components.

While the construction of the transfer tube 70, coupled with centrifugal force, causes the oil to move forward, the centrifugal force also causes the oil to spread circumferentially within the tube. Before arriving at the forward end of the tube, the oil spreads to the full circumference of the inner wall of transfer tube 70. The forward end of the transfer tube directly contacts the bearing 10 along a curved interface spaced radially inwardly in respect to the inner wall surface of the shaft. In the specific embodiment shown, this curved interface parallels an inner surface of the bearing outer race 12. This direct contact of the oil transfer tube to the bearing causes the oil to be dispersed into the bearing throughout a full perimeter of the curved interface, and the oil is consequently more evenly distributed over the inner surface of the bearing outer race 12 and throughout the bearing interior. This circumferential lubrication is desirable to improve both lubrication and cooling of the bearing.

The buildup of oil in the transfer tube 70 tends to cause the oil to move forward through the bearing, and the oil exits the bearing in the forward space between the bearing outer race 12 and inner race 14. A collector groove 80 is provided in the inner bore of the low pressure turbine rotor forward shaft 20 where the oil accumulates after lubricating the bearing 10. The collector groove 80 also serves as a deposit for small particles which come to rest in the groove where they cannot clog passages or otherwise harm the interior elements of the gas turbine engine. These particles can be removed during periodic maintenance of the engine. Axial slots 82 are cut in equally spaced positions in the low pressure shaft 20 around the bearing outer race 12 for causing the oil to flow aft from the oil collector groove 80. The slots are tapered in the forward direction, and centrifugal force resulting from shaft rotation causes the oil to flow aft.

The slots continue through spaces between the lugs 78 into a lubrication transfer region 84. The lubrication transfer region 84 is located in the space between the oil transfer tube 70 and the inner wall surface of shaft 20.

Circumferentially spaced exit holes, one of which is shown at 86, are provided for discharging oil from the transfer region 84 to an oil scavenging region 88. The oil scavenge region 88 contains an air-oil separator (not shown) where the oil is separated and recycled into the engine lubrication system.

Summarizing the operation of the apparatus of this invention in a gas turbine engine, oil from the engine lubrication system is injected by the oil nozzle 30 into the oil collector 40. The oil collector is mounted on the low pressure shaft 20 and rotates therewith. Centrifugal force, resulting from shaft rotation, causes the oil to flow radially outwardly, creating an oil layer in the annular dam portion of the oil collector. As the oil layer builds, the oil tends to flow forward through the axial holes 50 into the interior of shaft 20. The path of the oil is indicated by the solid line arrows in FIG. 1. At the forward end of the axial holes, the oil dispenser structure 60 directs the oil into the oil transfer tube 70. As the oil exits the forward end of the axially extending walls 62 of the dispenser structure 60, the oil is flung radially outwardly against the inner diameter of the transfer tube 70 where it spreads to form a circumferential film. The inner diameter of the transfer tube is flared in the forward direction, and centrifugal forces cause the oil to flow forward into the bearing 10. During its forward flow, the oil spreads to the entire inner diameter of the transfer tube thereby forming a circumferential film. The transfer tube is directly connected to the bearing at the region just inside the outer race 12. The direct contact of the transfer tube with the bearing causes the circumferential film of oil to enter the bearing over 360 degrees of an interface thereby more effectively cooling and lubricating the interior components of the bearing.

After lubricating and cooling the bearing, the oil continues its forward flow and accumulates in the collector groove 80. From the collector groove, flared slots 82 direct the oil around the outer perimeter of the bearing into the lubrication transfer region 84. The oil flows out of the shaft 20 through exit holes 86 into a scavenge region 88 where it is introduced back into the engine lubrication system for recycling.

A unique feature of this invention is the capability of the lubrication apparatus to cause oil to flow axially forward inside the outer concentric shaft 20 and, at the same time, allow pressurized cooling air to flow aft and exit the outer concentric shaft 20 without disturbing the flow of oil. The direction of flow of cooling air is indicated by the dashed line arrows in FIG. 1. The cooling air enters the forward end of the engine and flows aft in the region radially outward of the mid fan shaft 24 thereby cooling the length of shaft 24. The cooling air enters at 90, the region inside the low pressure shaft 20. The air continues to flow aft from position 90, but turns radially outwardly to flow through the openings between the quadrants of the oil dispenser structure 60. The air becomes mixed with the oil in the lubrication transfer region 84 and exits the interior of the outer concentric shaft through the exit holes 86, entering the scavenging region 88. In the scavenging region, the oil is separated from the air by an air-oil separator. The cooling air eventually flows out of the aft section of the engine.

The above-described operation of this invention is accomplished by an apparatus which does not locate any holes of similar stress raising structures in the highly stressed region of the differential bearing 10. This is an important feature in order to avoid creating high stress concentration which could lead to turbine shaft failure.

Another feature of this invention is its ability to lubricate the differential bearing with a circumferential film of oil that enters the bearing over 360 degrees of interface between the transfer tube and the bearing outer race. The bearing is thereby more effectively lubricated and cooled by the bearing lubrication system.

While specific embodiments of the subject invention have been described, it will be apparent to those skilled in the art that various modifications thereto can be made without departing from the scope of the invention as recited in the appended claims.

I claim:

1. In an apparatus having a cylindrical rotating shaft with a hollow interior partially defined by an inner wall surface, a lubrication-receiving device positioned radially inwardly in respect to the inner wall surface of said shaft, and having means for introducing lubricant into the interior of said shaft at a point remote from said lubrication-receiving device, improvements comprising:
   a transfer tube engaging the inner wall surface of said shaft for rotation therewith, a hollow region of said transfer tube extending from said means for introducing lubricant into said shaft to said lubrication-receiving device for supplying lubricant directly to said device;
   a collector groove adjacent said lubrication-receiving device for collecting lubricant that has traversed said lubrication-receiving device;
   an array of flared slots along the inner surface of said shaft and disposed around an outer perimeter of said lubrication-receiving device for directing lubricant from said collector groove;
   a lubrication transfer region circumferentially disposed around said transfer tube for receiving lubricant from said slots and transferring lubricant within said shaft; and
   exiting holes in said shaft for exhausting lubricant from said lubrication transfer region.

2. In an apparatus having a cylindrical rotating shaft with a hollow interior partially defined by an inner wall surface, a lubrication-receiving device positioned radially inwardly in respect to the inner wall surface of said shaft, and having means for introducing lubricant into the interior of said shaft at a point remote from said lubrication-receiving device, improvements comprising:
   a transfer tube engaging the inner wall surface of said shaft for rotation therewith, a hollow region of said transfer tube extending from said means for introducing lubricant into said shaft to said lubrication-receiving device for supplying lubricant directly to said device; and
   said means for introducing lubricant into the interior of said shaft being comprised of:
   (a) at least one passage extending from an exterior portion to the hollow interior of said shaft;
   (b) a dispenser extending from each of said passages for directing the lubricant to a position spaced radially inwardly from the inner wall surface of said shaft, wherein each of said dispensers comprises:
      (i) an axial wall, extending from each of said passages, for receiving lubricant;
      (ii) said wall having side portions for confining the flow of lubricant within a region defined by said wall and permitting a radial flow of a second fluid around the side portions of said walls; and (iii) an end portion of said wall being positioned within the hollow region of said transfer tube for depositing lubricant therein.

3. The apparatus recited in claim 2, wherein said transfer tube has a radially inwardly extending lip at the end of said tube to prevent the flow of lubricant in a direction away from said lubrication-receiving device.

4. In an apparatus having relatively rotating, inner and outer concentric shafts, wherein said outer shaft has a hollow interior partially defined by an inner wall surface and said apparatus has a lubrication-receiving device mounted between said shafts, an improvement for supplying and removing lubricant from said lubrication-receiving device, comprising:

(a) a plurality of passages extending from an exterior portion to the hollow interior of said shaft;

(b) a dispenser with an axial wall extending from each of said passages for directing the lubricant to a position spaced radially inwardly from the inner wall surface of said outer shaft;

(c) a hollow transfer tube engaging the inner wall surface of said outer shaft for rotation therewith, wherein the hollow region of said transfer tube extends from a region circumferentially surrounding said dispensers to said lubrication-receiving device along a curved interface spaced radially inwardly in respect to the inner wall surface of said outer shaft, and wherein said hollow transfer tube is provided for receiving lubricant from said dispensers and for directly introducing lubricant to said lubrication-receiving device over a full perimeter of said curved interface;

(d) a collector groove adjacent said lubrication-receiving device for collecting lubricant that has traversed said lubrication-receiving device;

(e) an array of flared slots along the inner surface of said outer shaft and disposed around an outer perimeter of said lubrication-receiving device for directing lubricant from said collector groove;

(f) a lubrication transfer region circumferentially disposed around said transfer tube for receiving lubricant from said slots and transferring lubricant within said outer shaft; and (g) exiting holes in said outer shaft for exhausting lubricant from said lubrication transfer region.

* * * * *